United States Patent
Wang et al.

(10) Patent No.: US 10,038,664 B2
(45) Date of Patent: Jul. 31, 2018

(54) TERMINAL STATUS SUBSCRIPTION METHOD, APPARATUS, AND SYSTEM

(71) Applicant: Huawei Technologies Co., Ltd., Shenzhen (CN)

(72) Inventors: Shuo Wang, Nanjing (CN); Changjiu Xu, Hanzhou (CN); Fei Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 15/056,416

(22) Filed: Feb. 29, 2016

(65) Prior Publication Data
US 2016/0182440 A1  Jun. 23, 2016

Related U.S. Application Data

(63) Continuation of application No. PCT/CN2014/077339, filed on May 13, 2014.

(30) Foreign Application Priority Data

Aug. 28, 2013  (CN) .......................... 2013 1 0382363

(51) Int. Cl.
*G06F 15/16* (2006.01)
*H04L 12/58* (2006.01)
(Continued)

(52) U.S. Cl.
CPC ............ *H04L 51/36* (2013.01); *H04L 41/085* (2013.01); *H04L 51/043* (2013.01); *H04L 67/10* (2013.01)

(58) Field of Classification Search
CPC ..... H04L 51/36; H04L 41/085; H04L 51/043; H04L 67/10
(Continued)

(56) References Cited

U.S. PATENT DOCUMENTS 8,060,121 B1 * 11/2011 Sun .......................... H04W 4/00
370/310.2
2005/0183096 A1 8/2005 Branigan et al.
(Continued)

FOREIGN PATENT DOCUMENTS

CN  101119325 A  2/2008
CN  101159761 A  4/2008
(Continued)

OTHER PUBLICATIONS

Partial English Translation and Abstract of Chinese Patent Application No. CN101217480, Mar. 9, 2016, 5 pages.
(Continued)

*Primary Examiner* — Liangche A Wang
*Assistant Examiner* — Kaylee Huang
(74) *Attorney, Agent, or Firm* — Conley Rose, P.C.

(57) ABSTRACT

A terminal status subscription method, apparatus, and system. The method includes receiving a notification message sent by a presence server serving a first terminal, acquiring identifiers of N terminals according to the notification message, sending N second subscription messages to a presence server separately serving the N terminals, to separately subscribe to status of the N terminals, receiving a status change notification message that is sent by a presence server serving a second terminal, and sending, according to the status change notification message, a publish message to the presence server serving the first terminal such that the presence server serving the first terminal notifies status of the second terminal of the first terminal, and hence subscription does not need to be separately performed such that subscription to status of multiple terminals of a user is implemented, and user operation complexity is reduced.

14 Claims, 9 Drawing Sheets

(51) Int. Cl.
*H04L 12/24* (2006.01)
*H04L 29/08* (2006.01)

(58) Field of Classification Search
USPC .................. 709/204, 206, 228, 238, 246
See application file for complete search history.

(56) References Cited

U.S. PATENT DOCUMENTS

| | | | |
|---|---|---|---|
| 2005/0216595 | A1 | 9/2005 | Miyata et al. |
| 2006/0129673 | A1* | 6/2006 | Majumdar .............. H04L 67/24 709/224 |
| 2008/0126360 | A1* | 5/2008 | Kakuta .................. H04L 67/24 |
| 2010/0217982 | A1* | 8/2010 | Brown ............... H04L 63/0807 713/168 |
| 2011/0055369 | A1 | 3/2011 | Oh et al. |
| 2013/0290457 | A1 | 10/2013 | Wang |

FOREIGN PATENT DOCUMENTS

| | | |
|---|---|---|
| CN | 101217480 A | 7/2008 |
| CN | 101330643 A | 12/2008 |
| CN | 101677302 A | 3/2010 |
| CN | 101998374 A | 3/2011 |
| CN | 102594718 A | 7/2012 |
| WO | 2006002750 A1 | 1/2006 |
| WO | 2012095742 A1 | 7/2012 |

OTHER PUBLICATIONS

Partial English Translation and Abstract of Chinese Patent Application No. CN101330643, Mar. 9, 2016, 4 pages.
Ding, K., "Enhanced Presence," Microsoft Lync Server, Resource Kit, 2010, 49 pages.
Foreign Communication From a Counterpart Application, European Application No. 14841299.2, Extended European Search Report dated Jul. 7, 2016, 9 pages.
Foreign Communication From a Counterpart Application, PCT Application No. PCT/CN2014/077339, English Translation of International Search Report dated Aug. 20, 2014, 2 pages.
Foreign Communication From a Counterpart Application, PCT Application No. PCT/CN2014/077339, English Translation of Written Opinion dated Aug. 20, 2014, 15 pages.
Machine Translation and Abstract of Chinese Publication No. CN101119325, dated Feb. 6, 2008, 12 pages.
Machine Translation and Abstract of Chinese Publication No. CN101677302, dated Mar. 24, 2010, 12 pages.
Machine Translation and Abstract of Chinese Publication No. CN101998374, dated Mar. 30, 2011, 16 pages.
Foreign Communication From a Counterpart Application, Chinese Application No. 201310382363.1, Chinese Office Action dated May 25, 2017, 8 pages.

* cited by examiner

TERMINAL STATUS SUBSCRIPTION METHOD, APPARATUS, AND SYSTEM

CROSS-REFERENCE TO RELATED APPLICATIONS

This application is a continuation of International Application No. PCT/CN2014/077339, filed on May 13, 2014, which claims priority to Chinese Patent Application No. 201310382363.1, filed on Aug. 28, 2013, both of which are hereby incorporated by reference in their entireties.

TECHNICAL FIELD

The present disclosure relates to the fields of computers and communications technologies, and in particular, to a terminal status subscription method, a terminal status subscription apparatus, and a terminal status subscription system.

BACKGROUND

A unified communication (UC) solution can support convergence and integration of a voice, a video, an instant message, status presence, and a conference and build a brand new enterprise communication solution for enterprises by coordination of multiple types of terminals, such as a fixed-line phone, a mobile phone, a computer, and a tablet computer, such as an iPAD. The status presence, as a key component of the UC solution, draws wider concerns from the enterprises. An enterprise user may learn about, according to a status presence function, current status of a terminal of a user whom the enterprise user needs to contact, to help the enterprise user select an optimal contact means to quickly find the user whom the enterprise user needs to contact. With ever-increasing user communications devices, the UC solution needs to support presentation, among users within an enterprise, of status of multiple terminals.

A technical solution in the prior art is, when status of multiple terminals needs to be updated among users, status subscription is performed successively according to a terminal identifier of each terminal. FIG. 1 is a schematic flowchart of a terminal status subscription method. As shown in FIG. 1, for example, if user B has three terminals that are separately represented as B1, B2, and B3, and user A and user C need to obtain status of the three terminals of user B, a terminal of user A needs to separately send three subscription messages to a presence server in order to separately subscribe to the status of the three terminals, B1, B2, and B3. Similarly, user C also needs to send three subscription messages to the presence server. When status of any one of the three terminals, B1, B2, and B3, changes, the corresponding terminal of user B publishes new status to the presence server using a publish message, and then, the presence server notifies the new status to the terminal of user A and a terminal of user C using a change notification message. When user A has N terminals, and the N terminals all need to display the status of the three terminals of user B, user A needs to execute 3N subscription operations in a case in which only the terminals of user A display the status of the terminals of user B.

Therefore, a disadvantage in the prior art lies in that a subscription terminal needs to separately subscribe to status of a to-be-subscribed-to terminal, and user operation complexity is increased, and when a quantity of users are increased in a system, and a quantity of terminals of each user are also increased, user operation complexity is further increased.

SUMMARY

Embodiments of the present disclosure provide a terminal device status subscription method, apparatus, and system, to address a problem in the prior art that a subscription terminal needs to separately perform subscription on a to-be-subscribed-to terminal and user operation is complex.

To address the foregoing technical problem, the embodiments of the present disclosure disclose the following technical solutions.

According to a first aspect, an embodiment of the present disclosure provides a terminal status subscription method, including receiving, by a terminal status subscription apparatus, a notification message sent by a presence server serving a first terminal, where the notification message is a message that is sent, by the presence server serving the first terminal, when the presence server determines that a received first subscription message sent by the first terminal includes an identifier of a to-be-subscribed-to user, and the notification message includes the identifier of the to-be-subscribed-to user, acquiring, by the terminal status subscription apparatus, identifiers of all N terminals of the to-be-subscribed-to user according to the identifier that is included in the notification message and is of the to-be-subscribed-to user, and a prestored association relationship between the identifier of the to-be-subscribed-to user and the identifiers of all the N terminals of the to-be-subscribed-to user, where N is a positive integer; sending, by the terminal status subscription apparatus, N second subscription messages to a presence server serving the N terminals, to separately subscribe to status of the N terminals, receiving, by the terminal status subscription apparatus, a status change notification message that is sent, by a presence server serving a second terminal among the N terminals, when the presence server receives status published by the second terminal, where the status change notification message includes an identifier of the second terminal and the status of the second terminal, acquiring, by the terminal status subscription apparatus, the identifier of the to-be-subscribed-to user according to the identifier that is in the status change notification message and is of the second terminal, and a prestored association relationship between the identifier of the to-be-subscribed-to user and the identifier of the second terminal; and sending, by the terminal status subscription apparatus according to the status change notification message, a publish message to the presence server serving the first terminal, where the publish message includes the identifier of the to-be-subscribed-to user, and the identifier of the second terminal and the status of the second terminal that are extracted from the status change notification message such that the presence server serving the first terminal notifies the first terminal of the status of the second terminal.

In a first possible implementation manner of the first aspect, the notification message further includes an identifier of the first terminal, and the step of the sending, by the terminal status subscription apparatus, N second subscription messages to a presence server serving the N terminals, to separately subscribe to status of the N terminals includes filling in a source address of each second subscription message with the identifier of the first terminal, and filling in a destination address of each second subscription message with an identifier of one terminal among the N terminals.

With reference to the first possible implementation manner of the first aspect, in a second possible implementation manner of the first aspect, the step of the sending, by the terminal status subscription apparatus according to the status change notification message, a publish message to the presence server serving the first terminal includes filling in a publish source field of the publish message with the acquired identifier of the to-be-subscribed-to user and the identifier that is in the status change notification message and is of the second terminal, and filling in a status node in the publish message with the status that is in the status change notification message and is of the second terminal.

In a third possible implementation manner of the first aspect, the terminal status subscription method further includes, when a new terminal is added for the to-be-subscribed-to user, storing an association relationship between an identifier of the new terminal and the identifier of the to-be-subscribed-to user, and sending a third subscription message to a presence server serving the new terminal, to subscribe to status of the new terminal.

With reference to the third possible implementation manner of the first aspect, in a fourth possible implementation manner of the first aspect, the notification message further includes an identifier of the first terminal, and the step of the sending a third subscription message to a presence server serving the new terminal, to subscribe to status of the new terminal includes filling in a source address of the third subscription message with the identifier of the first terminal, and filling in a destination address of the third subscription message with the identifier of the new terminal.

According to a second aspect, an embodiment of the present disclosure provides a terminal status subscription method, including receiving, by a presence server serving a first terminal, a first subscription message sent by the first terminal, where the first subscription message includes an identifier of a to-be-subscribed-to user, determining, by the presence server serving the first terminal and according to the identifier that is included in the first subscription message and is of the to-be-subscribed-to user, that the first subscription message is used for subscribing to status of all terminals associated with the to-be-subscribed-to user, sending, by the presence server serving the first terminal, a notification message to a terminal status subscription apparatus, where the notification message includes the identifier of the to-be-subscribed-to user such that the terminal status subscription apparatus separately subscribes to the status of the terminals from a presence server serving the terminals associated with the to-be-subscribed-to user, receiving, by the presence server serving the first terminal, a publish message sent by the terminal status subscription apparatus, where the publish message is a message that is sent by the terminal status subscription apparatus after the terminal status subscription apparatus receives a first status change notification message sent by a presence server serving a second terminal associated with the to-be-subscribed-to user. The first status change notification message includes an identifier of the second terminal and status published by the second terminal to the presence server serving the second terminal, and the publish message includes the identifier that is acquired by the terminal status subscription apparatus and is of the to-be-subscribed-to user associated with the second terminal, and the status published by the second terminal and the identifier of the second terminal that are extracted by the terminal status subscription apparatus from the first status change notification message, and sending, by the presence server serving the first terminal, a second status change notification message to the first terminal, where the second status change notification message includes the identifier of the to-be-subscribed-to user, the identifier of the second terminal, and the status published by the second terminal.

In a first possible implementation manner of the second aspect, the first subscription message further includes a destination address, and content of the destination address of the first subscription message is an identifier of any terminal among the N terminals.

According to a third aspect, an embodiment of the present disclosure provides a terminal status subscription apparatus, including a receiving unit configured to receive a notification message sent by a presence server serving the first terminal, where the notification message is a message that is sent, by the presence server serving the first terminal, when the presence server determines that a received first subscription message sent by the first terminal includes an identifier of a to-be-subscribed-to user, and the notification message includes the identifier of the to-be-subscribed-to user, an acquiring unit configured to acquire identifiers of all N terminals of the to-be-subscribed-to user according to the identifier that is included in the notification message and is of the to-be-subscribed-to user, and a prestored association relationship between the identifier of the to-be-subscribed-to user and the identifiers of all the N terminals of the to-be-subscribed-to user, where N is a positive integer, and a sending unit configured to send N second subscription messages to a presence server serving the N terminals, to separately subscribe to status of the N terminals, where the receiving unit is further configured to receive a status change notification message that is sent, by a presence server serving a second terminal among the N terminals, when the presence server receives status published by the second terminal, where the status change notification message includes an identifier of the second terminal and the status of the second terminal. The acquiring unit is further configured to acquire the identifier of the to-be-subscribed-to user according to the identifier that is in the status change notification message and is of the second terminal, and a prestored association relationship between the identifier of the to-be-subscribed-to user and the identifier of the second terminal, and the sending unit is further configured to send, according to the status change notification message, a publish message to the presence server serving the first terminal, where the publish message includes the identifier of the to-be-subscribed-to user, and the identifier of the second terminal and the status of the second terminal that are extracted from the status change notification message such that the presence server serving the first terminal notifies the first terminal of the status of the second terminal.

In a first possible implementation manner of the third aspect, the notification further includes an identifier of the first terminal, and the terminal status subscription apparatus further includes a first filling unit configured to fill in a source address of each second subscription message with the identifier of the first terminal, where the first filling unit is further configured to fill in a destination address of each second subscription message with an identifier of one terminal among the N terminals.

With reference to the first possible implementation manner of the third aspect, in a second possible implementation manner of the third aspect, the first filling unit is further configured to fill in a publish source field of the publish message with the acquired identifier of the to-be-subscribed-to user and the identifier that is in the status change notification message and is of the second terminal, and the first filling unit is further configured to fill in a status node in the publish message with the status that is in the status change notification message and is of the second terminal.

In a third possible implementation manner of the third aspect, the terminal status subscription apparatus further includes a storage unit configured to, when a new terminal is added for the to-be-subscribed-to user, store an association relationship between an identifier of the new terminal and the identifier of the to-be-subscribed-to user; and the sending unit is further configured to send a third subscription message to a presence server serving the new terminal, to subscribe to status of the new terminal.

With reference to the third possible implementation manner of the third aspect, in a fourth possible implementation manner of the third aspect, the notification further includes an identifier of the first terminal, and the terminal status subscription apparatus further includes a second filling unit, further configured to fill in a source address of the third subscription message with the identifier of the first terminal, where the second filling unit is further configured to fill in a destination address of the third subscription message with the identifier of the new terminal.

According to a fourth aspect, an embodiment of the present disclosure provides a presence server, including a receiving unit configured to receive a first subscription message sent by a first terminal, where the first subscription message includes an identifier of a to-be-subscribed-to user, a determining unit configured to determine, according to the identifier that is included in the first subscription message and is of the to-be-subscribed-to user, that the first subscription message is used for subscribing to status of all terminals associated with the to-be-subscribed-to user, and a sending unit configured to send a notification message to a terminal status subscription apparatus, where the notification message includes the identifier of the to-be-subscribed-to user such that the terminal status subscription apparatus separately subscribes to the status of the terminals from a presence server serving the terminals associated with the to-be-subscribed-to user, where the receiving unit is further configured to receive a publish message sent by the terminal status subscription apparatus, where the publish message is a message that is sent by the terminal status subscription apparatus after the terminal status subscription apparatus receives a first status change notification message sent by a presence server serving a second terminal associated with the to-be-subscribed-to user. The first status change notification message includes an identifier of the second terminal and status published by the second terminal to the presence server serving the second terminal, and the publish message includes the identifier that is acquired by the terminal status subscription apparatus and is of the to-be-subscribed-to user associated with the second terminal, and the status published by the second terminal and the identifier of the second terminal that are extracted by the terminal status subscription apparatus from the first status change notification message, and the sending unit is configured to send a second status change notification message to the first terminal, where the second status change notification message includes the identifier of the to-be-subscribed-to user, the identifier of the second terminal, and the status published by the second terminal.

In a first possible implementation manner of the fourth aspect, the first subscription message further includes a destination address, and content of the destination address of the first subscription message is an identifier of any terminal among the N terminals.

According to a fifth aspect, an embodiment of the present disclosure provides a terminal status subscription system, including the terminal status subscription apparatus in the third aspect and the presence server in the fourth aspect.

According to the terminal status subscription method, apparatus, and system that are provided in the embodiments of the present disclosure, the terminal status subscription apparatus stores an association relationship between an identifier of a to-be-subscribed-to user and identifiers of all N terminals of the to-be-subscribed-to user, and when the terminal status subscription apparatus receives a notification message sent by a presence server serving a first terminal, secondary subscription is performed. Therefore, subscription does not need to be separately performed, using the first terminal of a subscription user, on the terminals associated with the to-be-subscribed-to user such that subscription to status of multiple terminals of a user is implemented, and user operation complexity is reduced.

In addition, when a new terminal is added for the to-be-subscribed-to user, the terminal status subscription apparatus sends a third subscription message to a presence server serving the new terminal, to subscribe to status of the new terminal. Therefore, the subscription user can obtain the status of the added new terminal of the to-be-subscribed-to user without performing any processing, thereby simplifying interaction and processing between servers.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and a person of ordinary skill in the art may still derive other drawings from these accompanying drawings without creative efforts.

Each of FIG. 8A

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

The following introduces six embodiments in detail according to the foregoing inventive principle of the present disclosure, to provide detailed elaborations and descriptions on a main implementation principle of a method in the present disclosure.

First, second and the like that are mentioned in the following in the specification are used for distinguishing different information, data, requests, messages, and the like.

Figure 1:
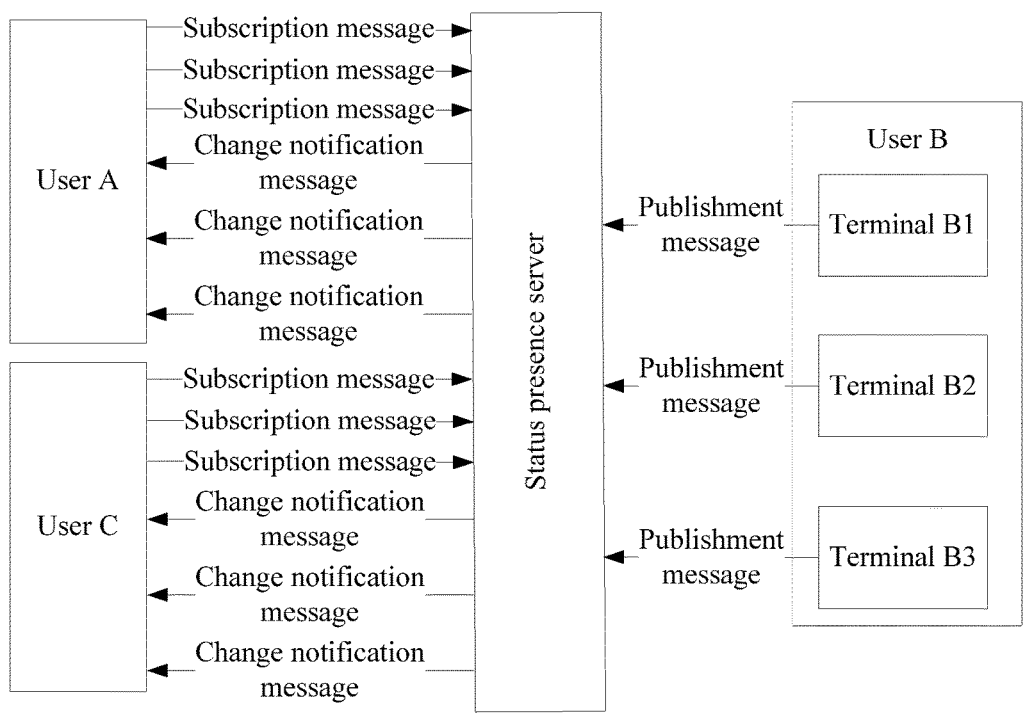
FIG. 1 is a schematic flowchart of a terminal status subscription method.
Figure 2:
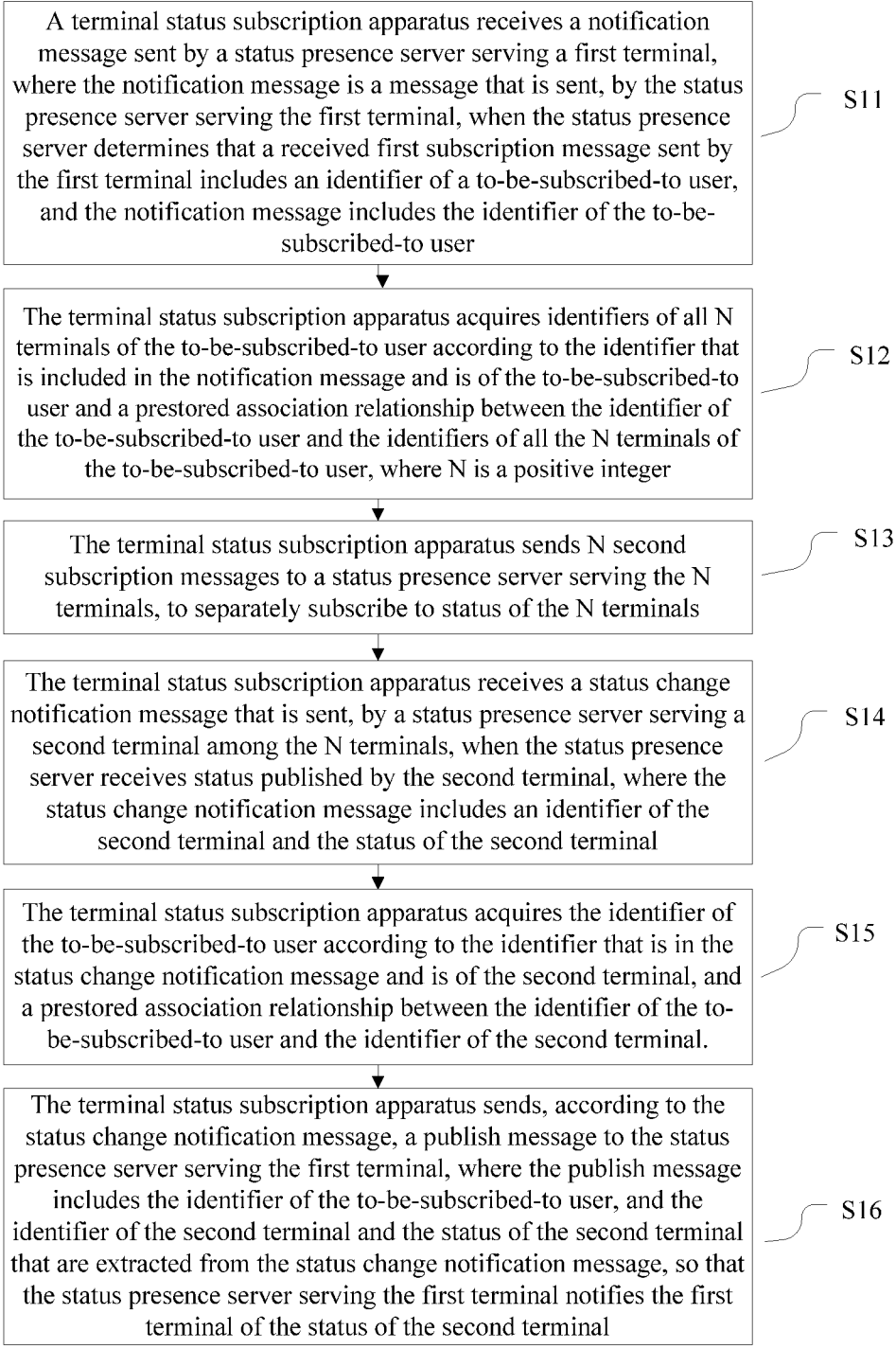
FIG. 2 is a schematic flowchart of a terminal status subscription method according to Embodiment 1 of the present disclosure.

A first embodiment of the present disclosure provides a terminal status subscription method. FIG. 2 is a schematic flowchart of a terminal status subscription method according to Embodiment 1 of the present disclosure. As shown in FIG. 2, the method includes the following steps.

Step S11: A terminal status subscription apparatus receives a notification message sent by a status presence server serving a first terminal, where the notification message is a message that is sent, by the status presence server serving the first terminal, when the status presence server determines that a received first subscription message sent by the first terminal includes an identifier of a to-be-subscribed-to user, and the notification message includes the identifier of the to-be-subscribed-to user.

The notification message further includes an identifier that is extracted by the presence server serving the first terminal from the first subscription message and is of the first terminal.

Step S12: The terminal status subscription apparatus acquires identifiers of all N terminals of the to-be-subscribed-to user according to the identifier that is included in the notification message and is of the to-be-subscribed-to user, and a prestored association relationship between the identifier of the to-be-subscribed-to user and the identifiers of all the N terminals of the to-be-subscribed-to user, where N is a positive integer.

Step S13: The terminal status subscription apparatus sends N second subscription messages to a presence server serving the N terminals, to separately subscribe to status of the N terminals.

Figure 3:
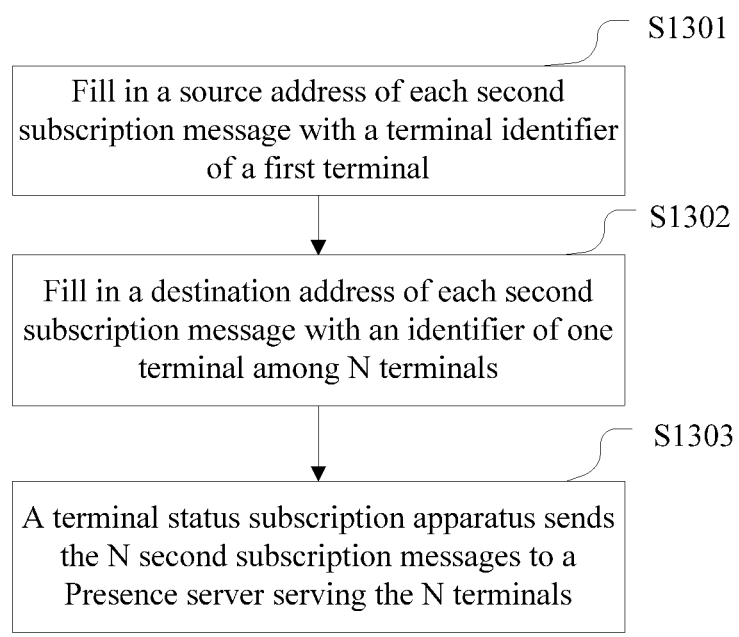
FIG. 3 is a schematic flowchart of secondary subscription according to Embodiment 1 of the present disclosure.

FIG. 3 is a schematic flowchart of secondary subscription according to Embodiment 1 of the present disclosure. As shown in FIG. 3, the secondary subscription in step S13 includes the following steps.

Step S1301: Fill in a source address of each second subscription message with the identifier of the first terminal.

Step S1302: Fill in a destination address of each second subscription message with an identifier of one terminal among the N terminals.

Step S1303: The terminal status subscription apparatus sends the N second subscription messages to the presence server serving the N terminals.

The second subscription message includes the source address and the destination address, and order between step S1301 and step S1302 may be random.

Step S14: The terminal status subscription apparatus receives a status change notification message that is sent, by a status presence server serving a second terminal among the N terminals, when the status presence server receives status published by the second terminal, where the status change notification message includes an identifier of the second terminal and the status of the second terminal.

What is received by the presence server serving the second terminal is a first publish message sent by the second terminal.

Furthermore, the first publish message includes a source address and a status node, content of the source address in the first publish message is the identifier of the second terminal, and content of the status node in the first publish message is the status of the second terminal.

The status change notification message further includes the identifier of the first terminal.

Step S15: The terminal status subscription apparatus acquires the identifier of the to-be-subscribed-to user according to the identifier that is in the status change notification message and is of the second terminal, and a prestored association relationship between the identifier of the to-be-subscribed-to user and the identifier of the second terminal.

Step S16: The terminal status subscription apparatus sends, according to the status change notification message, a publish message to the status presence server serving the first terminal, where the publish message includes the identifier of the to-be-subscribed-to user, and the identifier of the second terminal and the status of the second terminal that are extracted from the status change notification message such that the status presence server serving the first terminal notifies the first terminal of the status of the second terminal.

Figure 4:
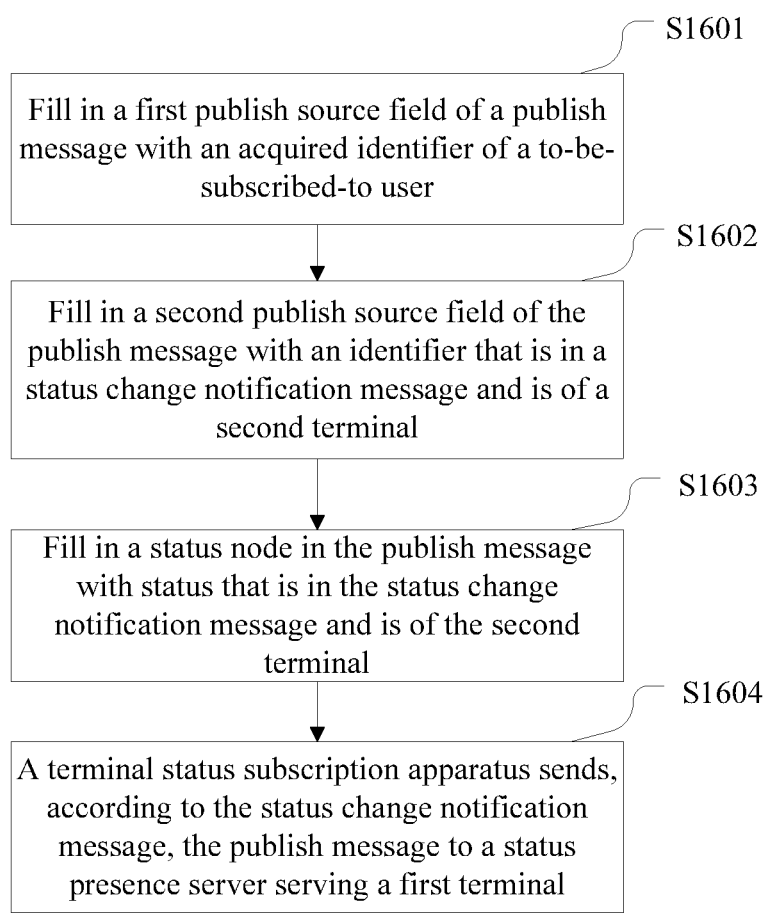
FIG. 4 is a schematic flowchart of secondary publish according to Embodiment 1 of the present disclosure.

FIG. 4 is a schematic flowchart of secondary publish according to Embodiment 1 of the present disclosure. As shown in FIG. 4, the secondary publish in step S16 includes the following steps.

Step S1601: Fill in a first publish source field of the publish message with the acquired identifier of the to-be-subscribed-to user.

Step S1602: Fill in a second publish source field of the publish message with the identifier that is in the status change notification message and is of the second terminal.

Step S1603: Fill in the status node in the publish message with the status that is in the status change notification message and is of the second terminal.

Step S1604: The terminal status subscription apparatus sends, according to the status change notification message, the publish message to the presence server serving the first terminal.

The publish message includes the first publish source field, the second publish source field, and the status node, and order among step S1601, step S1602, and step S1603 may be random.

Using the foregoing technical solution, the association relationship between the identifier of the to-be-subscribed-to user and the identifiers of all the N terminals of the to-be-subscribed-to user is prestored in the terminal status subscription apparatus, and after receiving the notification message sent by the presence server serving the first terminal, the terminal status subscription apparatus acquires the identifiers of the N terminals of the to-be-subscribed-to user from the association relationship according to the identifier that is included in the notification message and is of the to-be-subscribed-to user, or after receiving the status change notification message sent by the presence server serving the second terminal, the terminal status subscription apparatus acquires the identifier of the to-be-subscribed-to user according to the association relationship.

The terminal status subscription method in Embodiment 1 of the present disclosure is applied to a terminal status subscription apparatus side. According to the terminal status subscription method, secondary subscription is performed on a presence server based on primary subscription. Using the terminal status subscription apparatus, secondary subscription is performed on a presence server serving N terminals of a to-be-subscribed-to user such that subscription to status of multiple terminals of a user is implemented, and user operation complexity is reduced.

Figure 5:
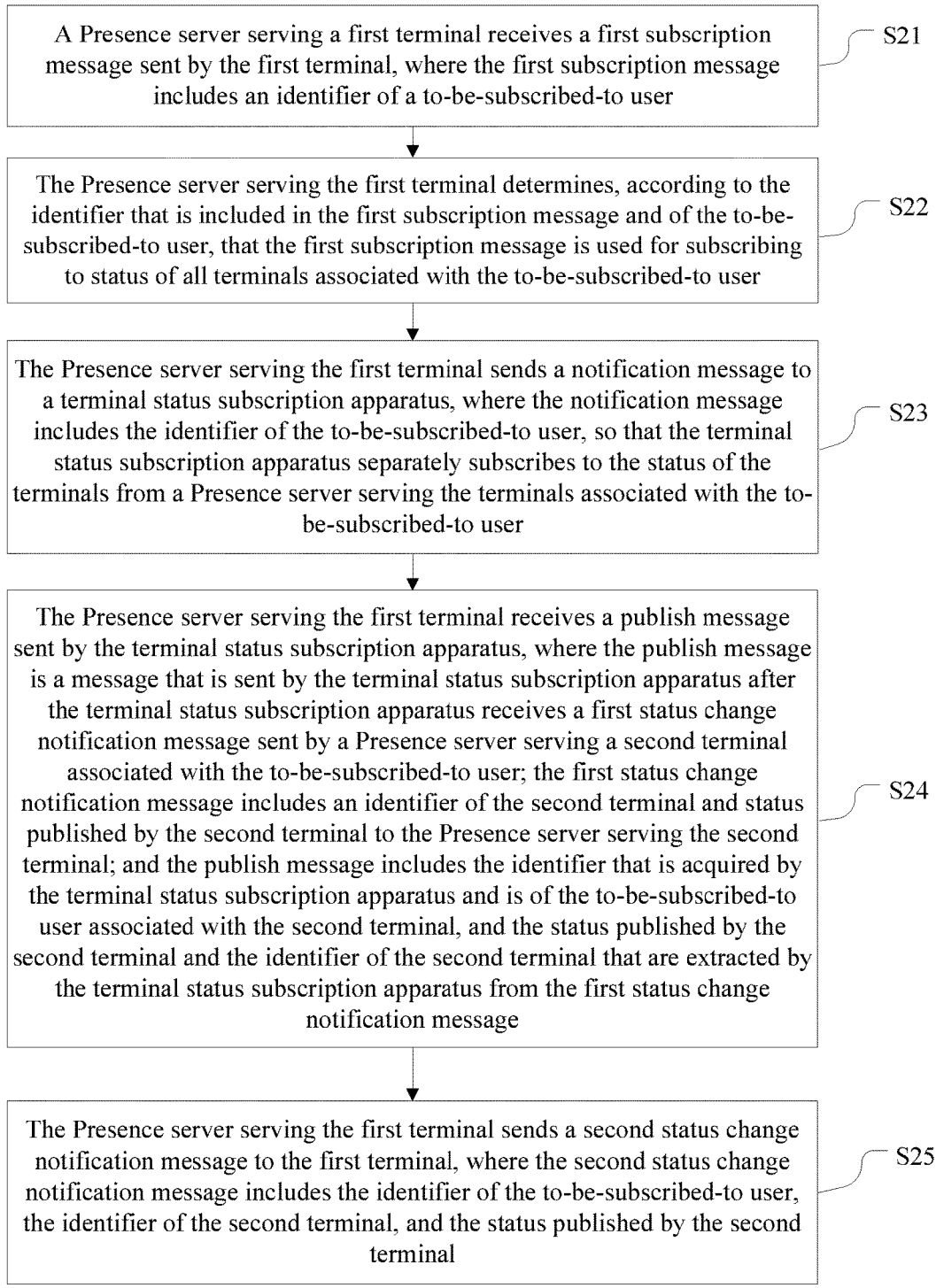
FIG. 5 is a schematic flowchart of a terminal status subscription method according to Embodiment 2 of the present disclosure.

A second embodiment of the present disclosure provides a terminal status subscription method. FIG. 5 is a schematic flowchart of a terminal status subscription method according to Embodiment 2 of the present disclosure. As shown in FIG. 5, the method includes the following steps.

Step S21: A presence server serving a first terminal receives a first subscription message sent by the first terminal, where the first subscription message includes an identifier of a to-be-subscribed-to user.

The first subscription message further includes an identifier of the first terminal and a destination address.

Further, content of the destination address of the first subscription message is an identifier of any terminal among the N terminals.

Step S22: The presence server serving the first terminal determines, according to the identifier that is included in the first subscription message and of the to-be-subscribed-to user, that the first subscription message is used for subscribing to status of all terminals associated with the to-be-subscribed-to user.

Step S23: The presence server serving the first terminal sends a notification message to a terminal status subscription apparatus, where the notification message includes the identifier of the to-be-subscribed-to user such that the terminal status subscription apparatus separately subscribes to the status of the terminals from a presence server serving the terminals associated with the to-be-subscribed-to user.

The notification message further includes the identifier of the first terminal.

Step S24: The presence server serving the first terminal receives a publish message sent by the terminal status subscription apparatus, where the publish message is a message that is sent by the terminal status subscription apparatus after the terminal status subscription apparatus receives a first status change notification message sent by a presence server serving a second terminal associated with the to-be-subscribed-to user. The first status change notification message includes an identifier of the second terminal and status published by the second terminal to the presence server serving the second terminal; and the publish message includes the identifier that is acquired by the terminal status subscription apparatus and is of the to-be-subscribed-to user associated with the second terminal, and the status published by the second terminal and the identifier of the second terminal that are extracted by the terminal status subscription apparatus from the first status change notification message.

The publish message includes, the identifier that is acquired by the terminal status subscription apparatus and is of the to-be-subscribed-to user, and the identifier that is in the first status change notification message and is of the second terminal.

Step S25: The presence server serving the first terminal sends a second status change notification message to the first terminal, where the second status change notification message includes the identifier of the to-be-subscribed-to user, the identifier of the second terminal, and the status published by the second terminal.

The terminal status subscription method in Embodiment 2 of the present disclosure is applied to a network service side, that is, applied to a presence server.

The terminal in the embodiment of the present disclosure includes, but is not limited to a personal computer (PC) client, a mobile phone client, a PAD client, or an Internet Protocol (IP) phone. The first terminal refers to a subscription terminal of a subscription user, and the second terminal refers to a to-be-subscribed-to terminal of a to-be-subscribed-to user.

A presence server is based on an object management architecture (OMA) standard, and status subscription, publish, and change notification of all terminal devices are implemented based on the standard session initiation protocol (SIP), where a terminal device status subscription message uses a "Subscribe" message in the SIP, a terminal device status publish message uses a "Publish" message in the SIP, and a terminal device status change notification message uses a "Notify" message in the SIP. Each of the subscription message, the publish message, and the status change notification message includes a message header and a message body. The message header includes a source address and a destination address, where the source address refers to a source of the message, and the destination address refers to a destination to which the message is sent. The message body is generally in an extensible markup language (XML) format, where the message body includes a status node, and status of a terminal can be obtained by parsing the status node, where the status node includes a terminal identifier of a to-be-subscribed-to terminal and status of the to-be-subscribed-to terminal, and the status node may further include position information of the to-be-subscribed-to terminal, and the status includes one of the following. A terminal is online, a terminal is offline, a terminal is busy, and a terminal is out of contact.

In the SIP, an identifier that is included in a subscription message and is of a to-be-subscribed-to user is set in a request field (a Request—uniform resource identifier (URI) field) of the subscription message, and a destination address (a TO field) of the subscription message is filled in with a terminal identifier of a to-be-subscribed-to terminal, or an identifier of a to-be-subscribed-to user and a terminal identifier of a to-be-subscribed-to terminal are both put in the destination address.

An existing UC account in a unified communication solution is used as an identifier of a to-be-subscribed-to user such that the status subscription method in the embodiment of the present disclosure may be implemented without changing an existing communications system, implementing smooth integration with the existing communications system.

When a subscription message does not include an identifier of a to-be-subscribed-to user, but includes only an identifier of a to-be-subscribed-to terminal, an existing technical solution is used. When the presence server serving the first terminal determines that the first subscription message includes only the identifier of the to-be-subscribed-to terminal, but does not include the identifier of the to-be-subscribed-to terminal. The solution is the first terminal of the subscription user sends first subscription messages of which a quantity is the same as a quantity of to-be-subscribed-to terminals to the presence server serving the first terminal, to separately subscribe to status of the to-be-subscribed-to terminals, and when status of the second terminal of the to-be-subscribed-to user changes, the second terminal publishes, using a publish message, new status to the presence server serving the second terminal, or when the first terminal and the second terminal are served by a same presence server, a subscription relationship that the first terminal subscribes to status of the second terminal is recorded, and when the second terminal publishes status, the status is sent to the first terminal.

Based on the foregoing Embodiment 1 and Embodiment 2, an interaction process of terminal status subscription is described in detail. For example, three terminals of to-be-subscribed-to user B are separately represented as B1, B2, and B3, subscription user A needs to learn about status of all the terminals of to-be-subscribed-to user B in real time, and specific steps of the terminal status subscription method in the present disclosure include the following steps.

Step b1: Subscription terminal A1 of subscription user A sends a first subscription message for status of all terminals of to-be-subscribed-to user B to a presence server serving A1, that is, a Request-URI field of the first subscription message carries an identifier of to-be-subscribed-to user B. A TO field of the first subscription message carries an identifier of any terminal of to-be-subscribed-to user B, which is an identifier of terminal B1 herein, and a source address of the first subscription message is an identifier of terminal A1.

Step b2: On the presence server serving subscription terminal A1 side, send a notification message to a terminal status subscription apparatus according to the first subscription message.

Step b3: Perform secondary subscription on a terminal status subscription apparatus side, that is, terminal identifiers of all the terminals, namely, identifiers of terminal B1, terminal B2, and terminal B3, of to-be-subscribed-to user B are acquired according to the identifier of to-be-subscribed-to user B, and a prestored association relationship between an identifier of a to-be-subscribed-to user and identifiers of all N terminals of the to-be-subscribed-to user, and then, send three second subscription messages to a presence server serving a to-be-subscribed-to terminal, to separately subscribe to status of terminal B1, terminal B2, and terminal B3.

Step b4: When status of terminal B2 of to-be-subscribed-to user B changes, terminal B2 sends a first publish message to a presence server serving terminal B2.

Step b5: After receiving the first publish message from terminal B2, the presence server serving terminal B2 sends a first status change notification message to the terminal status subscription apparatus, where the first status change notification message includes the identifier of subscription terminal A1, the terminal status subscription apparatus finds that terminal B2 is a terminal of to-be-subscribed-to user B according to the prestored association relationship between the identifier of the to-be-subscribed-to user and the identifiers of all the N terminals of the to-be-subscribed-to user in order to acquire the identifier of to-be-subscribed-to user B, where a source address of the first publish message is the identifier of terminal B2.

Step b6: Perform secondary publish on the terminal status subscription apparatus side, that is, a second publish message is sent to the presence server serving subscription terminal A1, where the second publish message includes two source addresses, namely, a first source address and a second source address, the first source address is filled in with a destination address of the first subscription message, namely, the terminal identifier of terminal B1, and the second source address is filled in with the source address of the first publish message, namely, the terminal identifier of terminal B2.

Step b7: After the presence server serving subscription terminal A1 receives the second publish message, the presence server serving subscription terminal A1 sends a second status change notification message to subscription terminal A1 according to the second publish message and the first subscription message, where a source address of the second status change notification message is filled in with the first source address of the second publish message, namely, the terminal identifier of terminal B1, and a destination address of the second status change notification message is filled in with the source address of the first subscription message, namely, the terminal identifier of subscription terminal A1. It can be seen that, an address of the second status change notification message herein is corresponding to that of the first subscription message, which complies with the SIP.

Step b8: Subscription terminal A1 of subscription user A receives the second status change notification message, obtains, by means of parsing and according to a status node of terminal B2, that status of terminal B2 of user B changes, and present status of terminal B2 on an interface, where the status node of terminal B2 is sourced from the first publish message, and is input to the second status change notification message using the second publish message.

Using the foregoing technical solution, a terminal status subscription apparatus stores an association relationship between an identifier of a to-be-subscribed-to user and identifiers of all N terminals of the to-be-subscribed-to user, and when the terminal status subscription apparatus receives a notification message sent by a presence server serving a first terminal, secondary subscription is performed. Therefore, subscription does not need to be separately performed on all terminals of a to-be-subscribed-to user using the first terminal of a subscription user, thereby reducing user operation complexity.

In addition, using the foregoing technical solution, status update with a user as a model may further be implemented without using a friend list, and load of a terminal device may also be reduced because the terminal device needs to send only a subscription message carrying an identifier of a to-be-subscribed-to user and an identifier of any terminal device of the to-be-subscribed-to user, and then, other work is completed at a presence server and a terminal status subscription apparatus.

In addition, when the subscription user does not need to subscribe to status of all the terminals of the to-be-subscribed-to user, message exchange is performed according to an identifier of each terminal. In this case, a subscription message does not need to carry the identifier of the to-be-subscribed-to user, and status update is performed between user terminals directly using the presence server.

Figure 6:
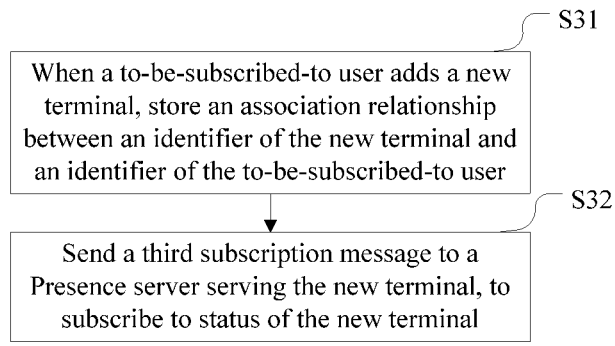
FIG. 6 is a schematic flowchart of a terminal status subscription method according to Embodiment 3 of the present disclosure.

A third embodiment of the present disclosure provides a terminal status subscription method. FIG. 6 is a schematic flowchart of a terminal status subscription method according to Embodiment 3 of the present disclosure. As shown in FIG. 6, based on steps in Embodiment 1 or Embodiment 2, the terminal status subscription method further includes the following steps.

Step S31: When a new terminal is added for the to-be-subscribed-to user, store an association relationship between an identifier of the new terminal and the identifier of the to-be-subscribed-to user.

Step S32: Send a third subscription message to a presence server serving the new terminal, to subscribe to status of the new terminal.

Figure 7:
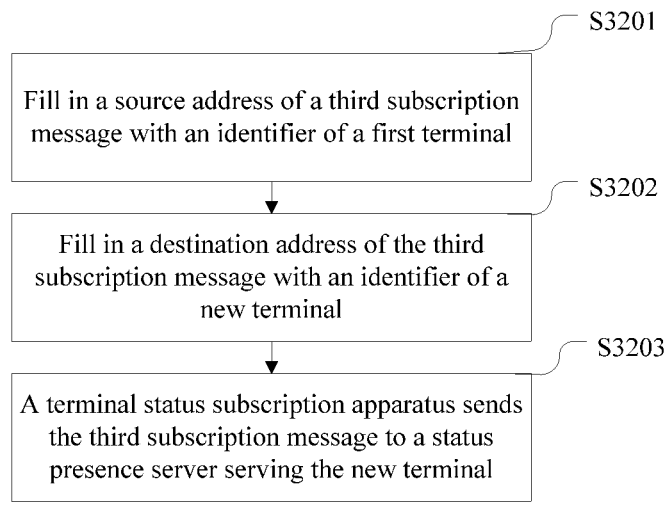
FIG. 7 is a schematic flowchart of tertiary subscription according to Embodiment 3 of the present disclosure.

FIG. 7 is a schematic flowchart of tertiary subscription according to Embodiment 3 of the present disclosure. As shown in FIG. 7, secondary publish in step S32 includes the following steps.

Step S3201: Fill in a source address of the third subscription message with the identifier of the first terminal.

Step S3202: Fill in a destination address of the third subscription message with the identifier of the new terminal.

Step S3203: The terminal status subscription apparatus sends the third subscription message to the presence server serving the new terminal.

The third subscription message includes the source address and the destination address, and order between step S3201 and step S3202 may be random.

The foregoing technical solution is steps such as automatically subscribing to a new terminal when the new terminal is added to a system, and operation and maintenance personnel do not need to perform complex manual maintenance on a presence server serving a subscription terminal, a presence server serving a to-be-subscribed-to terminal, or a terminal status subscription apparatus.

For example, terminal B4 is newly allocated to user B, and the embodiment includes the following steps.

Step c1: A terminal status subscription apparatus stores an association relationship between an identifier of new terminal B4 and an identifier of user B.

Step c2: Send a third subscription message to a presence server serving the new terminal B4, to subscribe to status of the new terminal B4, where the third subscription message includes a source address and a destination address. Further, the source address of the third subscription message is an identifier of subscription terminal A1, and the destination address of the third subscription message is the identifier of new terminal B4, and a step after step c2 is the same as the step in Embodiment 1.

Step c3: When status of new terminal B4 changes, new terminal B4 sends a first publish message to the presence server serving new terminal B4, where the first publish message carries a status node of new terminal B4.

Step c4: After receiving the first publish message from new terminal B4, the presence server serving new terminal B4 sends a first status change notification message to the terminal status subscription apparatus, where the first status change notification message includes the identifier of subscription terminal A1, and the identifier of new terminal B4 and status of new terminal B4 that are extracted from the first publish message.

Step c5: The terminal status subscription apparatus sends, according to the first status change notification message, a second publish message to the presence server serving subscription terminal A1, where the second publish message includes the identifier of to-be-subscribed-to user B, and the identifier of new terminal B4 and the status of new terminal B4 that are extracted from the first status change notification message.

Step c6: After receiving the second publish message, the presence server serving subscription terminal A1 sends a change notification message to subscription terminal A1, where the change notification message carries the status node of new terminal B4, and terminal A1 parses the status node in the change notification message and presents the status of new terminal.

Using the foregoing technical solution, when a new terminal is added for a user, publish of status of the new terminal may be implemented without any additional processing of a subscription user terminal such that a processing method is simplified, and publish efficiency of a newly-bound terminal is improved.

Figure 8A:
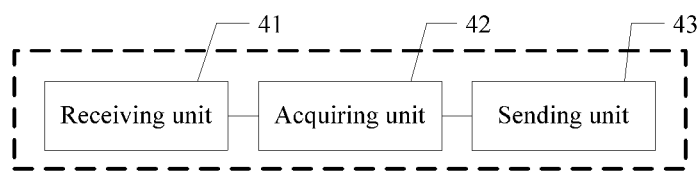
FIG. 8B is a schematic structural diagram of a terminal status subscription apparatus according to Embodiment 4 of the present disclosure.

A fourth embodiment of the present disclosure provides a terminal status subscription apparatus. FIG. 8A is a schematic structural diagram of a terminal status subscription apparatus according to Embodiment 4 of the present disclosure. As shown in FIG. 8A, the terminal status subscription apparatus is formed by modules in a dotted box. The terminal status subscription apparatus includes a receiving unit 41, an acquiring unit 42, and a sending unit 43.

The receiving unit 41 is configured to receive a notification message sent by a presence server serving a first terminal, where the notification message is a message that is sent, by the presence server serving the first terminal, when the presence server determines that a received first subscription message sent by the first terminal includes an identifier of a to-be-subscribed-to user, and the notification message includes the identifier of the to-be-subscribed-to user.

The notification message further includes an identifier, extracted by the presence server serving the first terminal from the first subscription message, of the first terminal.

The acquiring unit 42 is configured to acquire identifiers of the N terminals according to the identifier that is included in the notification message and is of the to-be-subscribed-to user, and a prestored association relationship between the identifier of the to-be-subscribed-to user and the identifiers of all the N terminals of the to-be-subscribed-to user, where N is a positive integer.

The receiving unit is further configured to receive a status change notification message that is sent, by a presence server serving a second terminal among the N terminals, when the presence server receives status published by the second terminal, where the status change notification message includes an identifier of the second terminal and the status of the second terminal.

The acquiring unit is further configured to acquire the identifier of the to-be-subscribed-to user according to the identifier that is in the status change notification message and is of the second terminal, and a prestored association relationship between the identifier of the to-be-subscribed-to user and the identifier of the second terminal.

The sending unit 43 is configured to send N second subscription messages to a presence server serving the N terminals, to separately subscribe to status of the N terminals.

The sending unit 43 is further configured to send, according to the status change notification message, a publish message to the presence server serving the first terminal, where the publish message includes the identifier of the to-be-subscribed-to user, and the identifier of the second terminal and the status of the second terminal that are extracted from the status change notification message such that the presence server serving the first terminal notifies the first terminal of the status of the second terminal.

Figure 8B:
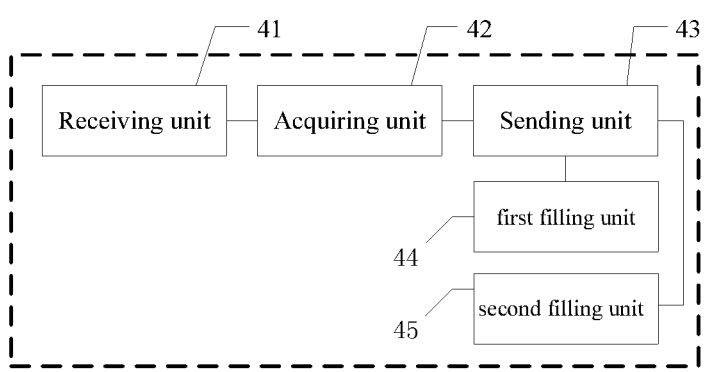

Further, according to the terminal status subscription apparatus in the embodiment of the present disclosure, the notification further includes the identifier of the first terminal, and as shown in FIG. 8B, the apparatus further includes a first filling unit 44 configured to fill in a source address of each second subscription message with the identifier of the first terminal.

The first filling unit 44 is further configured to fill in a destination address of each second subscription message with an identifier of one terminal among the N terminals.

The second subscription message includes the source address and the destination address.

Further, according to the terminal status subscription apparatus in the embodiment of the present disclosure, the first filling unit 44 is further configured to fill in a publish source field of the publish message with the acquired identifier of the to-be-subscribed-to user and the identifier that is in the status change notification message and is of the second terminal.

The first filling unit 44 is further configured to fill in a status node in the publish message with the status that is in the status change notification message and is of the second terminal.

Figure 9:
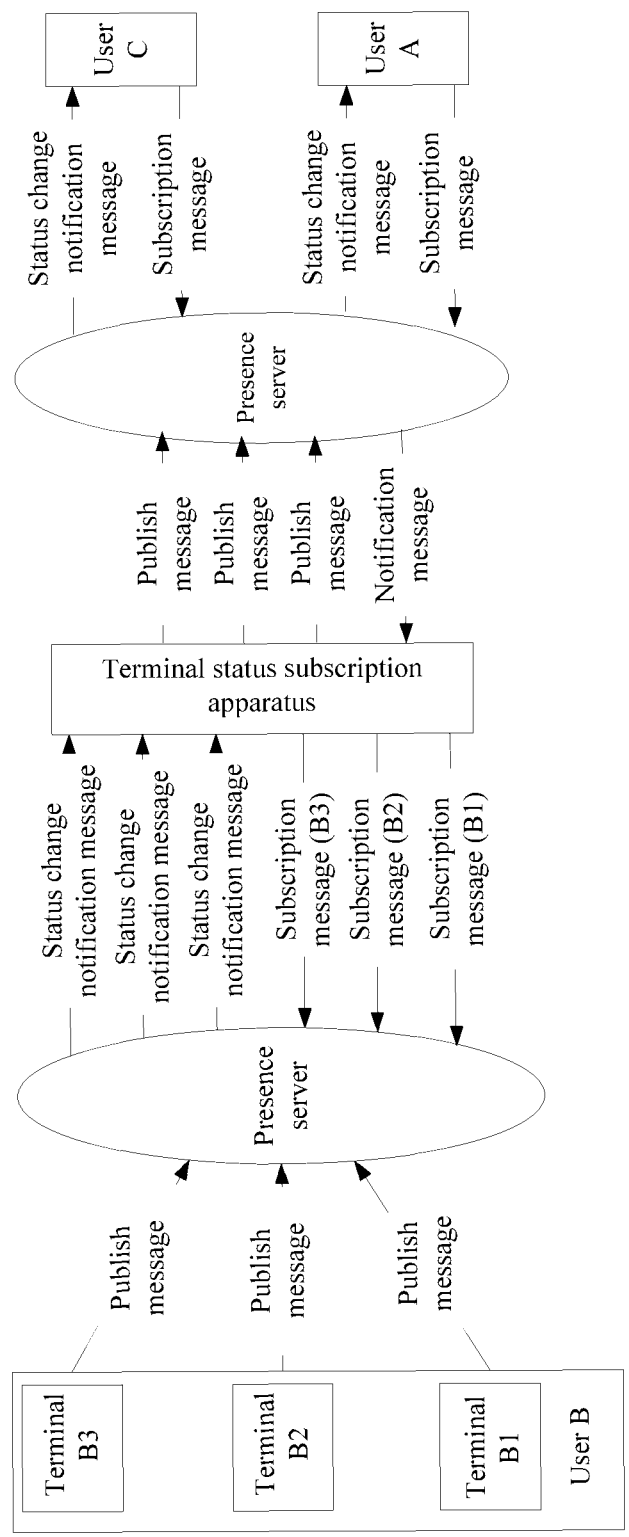
FIG. 9 is a schematic diagram of message sending of a terminal status subscription apparatus according to Embodiment 4 of the present disclosure.

The terminal status subscription apparatus in Embodiment 4 of the present disclosure is an implementation apparatus of the terminal status subscription method in Embodiment 1, and a specific principle of the terminal status subscription apparatus is the same as that of the terminal status subscription method in Embodiment 1. FIG. 9 is a schematic diagram of message sending of the terminal status subscription apparatus according to Embodiment 4 of the present disclosure. As shown in FIG. 9, when a presence server serving a subscription terminal receives a subscription message sent by a terminal of user A and the subscription message carries an identifier of user B, the presence server serving the subscription terminal sends a notification message to the terminal status subscription apparatus, and the terminal status subscription apparatus parses the notification message and separately sends, according to a pre-stored association relationship between an identifier of the to-be-subscribed-to user and identifiers of all N terminals of the to-be-subscribed-to user, subscription messages for all terminals, B1, B2, and B3, of subscription user B to a presence server separately serving to-be-subscribed-to terminals, that is, secondary subscription. When receiving a first publish message from terminal B1, terminal B2, or terminal B3, the presence server separately serving the to-be-subscribed-to terminals sends the first publish message to the terminal status subscription apparatus, and the terminal status subscription apparatus performs secondary publish, that is, status of terminal B1, terminal B2, or terminal B3 is secondarily published to the presence server serving the subscription terminal, and the presence server serving the subscription terminal separately sends a change notification message to the terminal of user A and a terminal of user C. It can be seen that, compared with an existing presence server, the embodiment of the present disclosure has an advantage that, only a terminal status subscription apparatus is added, and the existing presence server is very slightly modified.

The terminal status subscription apparatus in Embodiment 4 of the present disclosure is deployed on a presence server, and in addition to that an existing presence server performs terminal status subscription and notification based on a terminal device identifier, a secondary status subscription notification method is used such that subscription and real-time notification of status of multiple terminals of a user are implemented. The subscription apparatus uses an interface description language (IDL) to perform information exchange with a presence server.

The terminal status subscription apparatus can, without changing an existing status server, effectively reduce time for transmitting a subscription message on a network and reduce user operation complexity.

Figure 10:
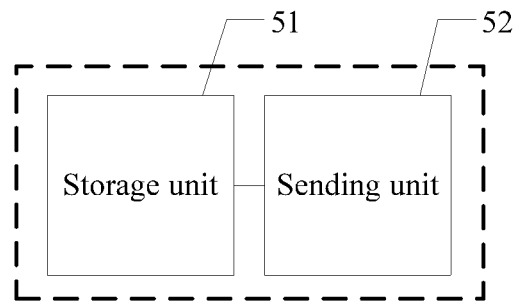
FIG. 10 is a schematic structural diagram of a terminal status subscription apparatus according to Embodiment 5 of the present disclosure.

A fifth embodiment of the present disclosure provides a terminal status subscription apparatus. FIG. 10 is a schematic structural diagram of a terminal status subscription apparatus according to Embodiment 5 of the present disclosure. As shown in FIG. 10, the terminal status subscription apparatus in the embodiment of the present disclosure further includes a storage unit 51 configured to, when a new terminal is added for a to-be-subscribed-to user, store an association relationship between an identifier of the new terminal and an identifier of the to-be-subscribed-to user, and a sending unit 52 configured to send a third subscription message to a presence server serving the new terminal, to subscribe to status of the new terminal.

The notification further includes an identifier of the first terminal, and the terminal status subscription apparatus further includes a second filling unit 45, further configured to fill in a source address of the third subscription message with the identifier of the first terminal.

The second filling unit 45 is further configured to fill in a destination address of the third subscription message with the identifier of the new terminal.

The sending unit in the embodiment of the present disclosure is the same as the sending unit in Embodiment 4.

The terminal status subscription apparatus in Embodiment 5 of the present disclosure is an implementation apparatus of the terminal status subscription method in Embodiment 3, a specific principle of the terminal status subscription apparatus is the same as that of the terminal status subscription method in Embodiment 3 and is based on automatic subscription of a new terminal, and therefore, details are not repeatedly described again.

Figure 11:
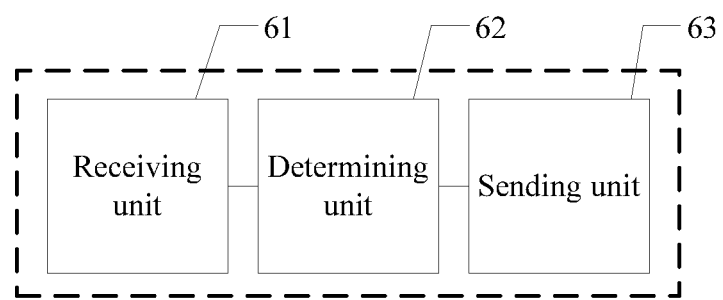
FIG. 11 is a schematic structural diagram of a presence server according to Embodiment 6 of the present disclosure.

A sixth embodiment of the present disclosure provides a presence server. FIG. 11 is a schematic structural diagram of a presence server according to Embodiment 6 of the present disclosure. As shown in FIG. 11, the presence server in the embodiment of the present disclosure further includes a receiving unit 61 configured to receive a first subscription message sent by a first terminal, where the first subscription message includes an identifier of a to-be-subscribed-to user, a determining unit 62 configured to determine, according to the identifier that is included in the first subscription message and is of the to-be-subscribed-to user, that the first subscription message is used for subscribing to status of all terminals associated with the to-be-subscribed-to user, and a sending unit 63 configured to send a notification message to a terminal status subscription apparatus, where the notification message includes the identifier of the to-be-subscribed-to user such that the terminal status subscription apparatus separately subscribes to the status of the terminals from a presence server serving the terminals associated with the to-be-subscribed-to user.

The receiving unit 61 is further configured to receive a publish message sent by the terminal status subscription apparatus, where the publish message is a message that is sent by the terminal status subscription apparatus after the terminal status subscription apparatus receives a first status change notification message sent by a presence server serving a second terminal associated with the to-be-subscribed-to user. The first status change notification message includes an identifier of the second terminal and status published by the second terminal to the presence server serving the second terminal, and the publish message includes the identifier that is acquired by the terminal status subscription apparatus and is of the to-be-subscribed-to user associated with the second terminal, and the status published by the second terminal and the identifier of the second terminal that are extracted by the terminal status subscription apparatus from the first status change notification message.

The sending unit 63 is configured to send a second status change notification message to the first terminal, where the second status change notification message includes the identifier of the to-be-subscribed-to user, the identifier of the second terminal, and the status published by the second terminal.

Further, the first subscription message further includes a destination address, and content of the destination address of the first subscription message is an identifier of any terminal among the terminals.

The presence server in Embodiment 6 of the present disclosure is an apparatus for implementing the terminal status subscription method in Embodiment 2, a specific principle of the presence server is the same as that of the terminal status subscription method in Embodiment 2 and is based on automatic subscription of a new terminal, and therefore, details are not repeatedly described again.

Figure 12:
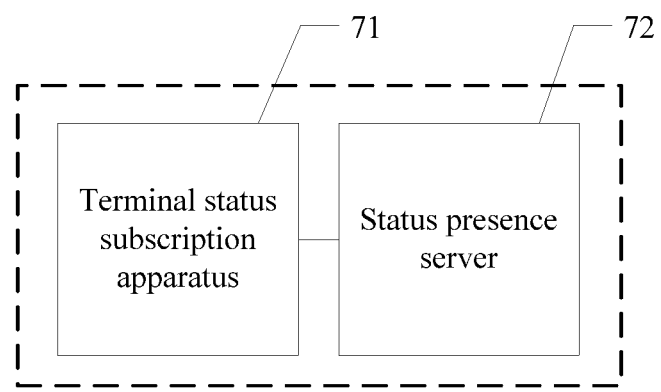
FIG. 12 is a schematic structural diagram of a terminal status subscription system according to Embodiment 7 of the present disclosure.

A seventh embodiment of the present disclosure provides a terminal status subscription system. FIG. 12 is a schematic structural diagram of a terminal status subscription system according to Embodiment 7. As shown in FIG. 12, the system includes the terminal status subscription apparatus 71 in Embodiment 5 and the status presence server 72 in Embodiment 6.

Figure 13:
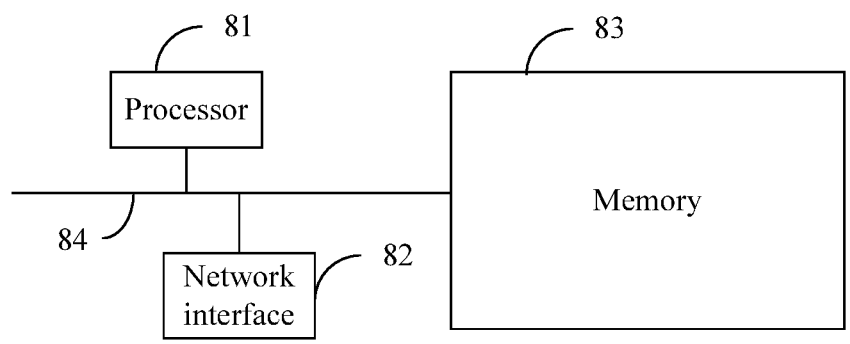
FIG. 13 is a schematic structural diagram of a processor according to Embodiment 8 of the present disclosure.

According to an eighth embodiment of the present disclosure, a terminal status subscription apparatus in the foregoing embodiment may, as shown in FIG. 13, include at least one processor 81 (for example, central processing unit (CPU)), at least one network interface 82 or at least one other communications interface, a memory 83, and at least one communications bus 84 configured to implement connection and communication among these apparatuses. The processor 81 is configured to execute an executable module, for example, a computer program, stored in the memory 83. The memory 83 may include a high-speed random access memory (RAM), or may include a non-volatile memory, for example, at least one magnetic disk memory. When communication connection between the terminal status subscription apparatus and at least one other network element is implemented using the at least one network interface 82 (which may be wired or wireless), an Internet, a wide area network, a local area network, a metropolitan area network, or the like may be used.

In some implementation manners, the memory 83 stores a program. The program may be executed by the processor 81. The program include receiving, by a terminal status subscription apparatus, a notification message sent by a presence server serving a first terminal, acquiring identifiers of all N terminals of a to-be-subscribed-to user according to an identifier that is included in the notification message and is of the to-be-subscribed-to user, and a prestored association relationship between the identifier of the to-be-subscribed-to user and the identifiers of all the N terminals of the to-be-subscribed-to user, and sending N subscription messages to a presence server serving the N terminals, to separately subscribe to status of the N terminals; and receiving a status change notification message sent by a presence server serving a second terminal among the N terminals, acquiring the identifier of the to-be-subscribed-to user according to the identifier that is in the status change notification message and is of the second terminal, and a prestored association relationship between the identifier of the to-be-subscribed-to user and the identifier of the second terminal, and sending a second publish message to the presence server serving the first terminal according to the status change notification message.

A person of ordinary skill in the art may understand that, each aspect of the present disclosure or a possible implementation manner of each aspect may be further implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a read-only memory (ROM), an erasable programmable read only memory (EPROM or flash memory), an optical fiber, and a compact disc read only memory (CD-ROM).

A processor in a computer reads computer-readable program code stored in a computer-readable medium such that the processor can perform a function and an action specified in each step or a combination of steps in a flowchart. An apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A terminal status subscription method, comprising:
receiving, by a terminal status subscription apparatus, a notification message from a first presence server serving a first terminal, the notification message being a message that is received from the first presence server when the first presence server determines that a received first subscription message sent by the first terminal comprises an identifier of a to-be-subscribed-to user, and the notification message comprising the identifier of the to-be-subscribed-to user;
acquiring, by the terminal status subscription apparatus, identifiers of N terminals associated with the to-be-subscribed-to user according to the identifier of the to-be-subscribed-to user and a prestored association relationship between the identifier of the to-be-subscribed-to user and the identifiers of the N terminals associated with the to-be-subscribed-to user, N being a positive integer greater than or equal to two;

sending, by the terminal status subscription apparatus, N second subscription messages to a second presence server serving the N terminals to separately subscribe to a status of the N terminals;

receiving, by the terminal status subscription apparatus, a status change notification message from the second presence server serving a second terminal among the N terminals when the second presence server receives status published by the second terminal, the status change notification message comprising an identifier of the second terminal and a status of the second terminal;

acquiring, by the terminal status subscription apparatus, the identifier of the to-be-subscribed-to user according to the identifier of the second terminal and a prestored association relationship between the identifier of the to-be-subscribed-to user and the identifier of the second terminal; and sending, by the terminal status subscription apparatus according to the status change notification message, a publish message to the first presence server, the publish message comprising the identifier of the to-be-subscribed-to user, the identifier of the second terminal, and the status of the second terminal that are extracted from the status change notification message such that the first presence server notifies the first terminal of the status of the second terminal.

2. The terminal status subscription method according to claim 1, wherein the notification message further comprises an identifier of the first terminal, and sending, by the terminal status subscription apparatus, the N second subscription messages to the second presence server, to separately subscribe to the status of the N terminals comprises:

filling in a source address of each second subscription message with the identifier of the first terminal; and filling in a destination address of each second subscription message with an identifier of one terminal among the N terminals.

3. The terminal status subscription method according to claim 2, wherein sending, by the terminal status subscription apparatus according to the status change notification message, the publish message to the first presence server comprises:

filling in a publish source field of the publish message with the identifier of the to-be-subscribed-to user and the identifier that is in the status change notification message and is of the second terminal; and filling in a status node in the publish message with the status that is in the status change notification message and is of the second terminal.

4. The terminal status subscription method according to claim 1, further comprising:

storing an association relationship between an identifier of a new terminal and the identifier of the to-be-subscribed-to user when the new terminal is added for the to-be-subscribed-to user; and sending a third subscription message to a third presence server serving the new terminal to subscribe to a status of the new terminal.

5. The terminal status subscription method according to claim 4, wherein the notification message further comprises an identifier of the first terminal, and sending the third subscription message to the third presence server, to subscribe to the status of the new terminal comprises:

filling in a source address of the third subscription message with the identifier of the first terminal; and filling in a destination address of the third subscription message with the identifier of the new terminal.

6. A terminal status subscription method, comprising:

receiving, by a first presence server serving a first terminal, a first subscription message from the first terminal, wherein the first subscription message comprising an identifier of a to-be-subscribed-to user;

determining, by the first presence server according to the identifier of the to-be-subscribed-to user, that the first subscription message is used for subscribing to a status of all terminals associated with the to-be-subscribed-to user;

sending, by the first presence server, a notification message to a terminal status subscription apparatus, the notification message comprising the identifier of the to-be-subscribed-to user such that the terminal status subscription apparatus separately subscribes to a status of the terminals from a second presence server serving the terminals associated with the to-be-subscribed-to user;

receiving, by the first presence server, a publish message from the terminal status subscription apparatus, the publish message being a message that is received from the terminal status subscription apparatus after the terminal status subscription apparatus receives a first status change notification message from the second presence server serving a second terminal associated with the to-be-subscribed-to user, the first status change notification message comprising an identifier of the second terminal and status published by the second terminal to the second presence server, and the publish message comprising the identifier of the to-be-subscribed-to user associated with the second terminal, the status published by the second terminal, and the identifier of the second terminal that are extracted by the terminal status subscription apparatus from the first status change notification message; and sending, by the first presence server, a second status change notification message to the first terminal, the second status change notification message comprising the identifier of the to-be-subscribed-to user, the identifier of the second terminal, and the status published by the second terminal.

7. The terminal status subscription method according to claim 6, wherein the first subscription message further comprises a destination address, and the destination address of the first subscription message is an identifier of any terminal among the terminals.

8. A terminal status subscription apparatus, comprising:

a non-transitory computer readable medium comprising computer-executable instructions; and a processor coupled to the non-transitory computer readable medium and configured to execute the computer-executable instructions to perform operations comprising:

receiving a notification message from a first presence server serving a first terminal, the notification message being a message that is received from the first presence server, when the first presence server determines that a received first subscription message received from the first terminal comprises an identifier of a to-be-subscribed-to user, and the notification message comprising the identifier of the to-be-subscribed-to user;

acquiring identifiers of N terminals associated with the to-be-subscribed-to user according to the identifier of the to-be-subscribed-to user and a prestored association relationship between the identifier of the to-be-subscribed-to user and the identifiers of the N terminals associated with the to-be-subscribed-to user, N being a positive integer greater than or equal to two;

sending N second subscription messages to a second presence server serving the N terminals to separately subscribe to status of the N terminals;

receive a status change notification message from the second presence server that is serving a second terminal among the N terminals when the second presence server receives status published by the second terminal, the status change notification message comprising an identifier of the second terminal and a status of the second terminal;

acquiring the identifier of the to-be-subscribed-to user according to the identifier of the second terminal and the prestored association relationship between the identifier of the to-be-subscribed-to user and the identifier of the second terminal; and sending, according to the status change notification message, a publish message to the first presence server, the publish message comprising the identifier of the to-be-subscribed-to user, the identifier of the second terminal, and the status of the second terminal that are extracted from the status change notification message such that the first presence server notifies the first terminal of the status of the second terminal.

9. The terminal status subscription apparatus according to claim 8, wherein the notification message further comprises an identifier of the first terminal, and sending the N second subscription messages to the second presence server to separately subscribe to the status of the N terminals comprises:

filling in a source address of each second subscription message with the identifier of the first terminal; and filling in a destination address of each second subscription message with an identifier of one terminal among the N terminals.

10. The terminal status subscription apparatus according to claim 9, wherein sending, according to the status change notification message, the publish message to the first presence server comprises:

filling in a publish source field of the publish message with the identifier of the to-be-subscribed-to user and the identifier that is in the status change notification message and is of the second terminal; and filling in a status node in the publish message with the status that is in the status change notification message and is of the second terminal.

11. The terminal status subscription apparatus according to claim 8, wherein the processor is further configured to execute the computer-executable instructions to perform further operations comprising:

storing an association relationship between an identifier of a new terminal and the identifier of the to-be-subscribed-to user when the new terminal is added for the to-be-subscribed-to user; and sending a third subscription message to a third presence server serving the new terminal, to subscribe to a status of the new terminal.

12. The terminal status subscription apparatus according to claim 11, wherein the notification message further comprises an identifier of the first terminal, and sending the third subscription message to the third presence server to subscribe to the status of the new terminal comprises:

filling in a source address of the third subscription message with the identifier of the first terminal; and filling in a destination address of the third subscription message with the identifier of the new terminal.

13. A first presence server, comprising:

a non-transitory computer readable medium comprising computer-executable instructions; and a processor coupled to the non-transitory computer readable medium and configured to execute the computer-executable instructions to perform operations comprising:

receiving a first subscription message from a first terminal that is served by the first presence server, the first subscription message comprising an identifier of a to-be-subscribed-to user;

determining, according to the identifier of the to-be-subscribed-to user, that the first subscription message is used for subscribing to status of all terminals associated with the to-be-subscribed-to user;

sending a notification message to a terminal status subscription apparatus, the notification message comprising the identifier of the to-be-subscribed-to user such that the terminal status subscription apparatus separately subscribes to a status of the terminals from a second presence server serving the terminals associated with the to-be-subscribed-to user;

receiving a publish message from the terminal status subscription apparatus, the publish message is a message received from the terminal status subscription apparatus after the terminal status subscription apparatus receives a first status change notification message from the second presence server serving a second terminal associated with the to-be-subscribed-to user, the first status change notification message comprising an identifier of the second terminal and status published by the second terminal to the second presence server, and the publish message comprising the identifier of the to-be-subscribed-to user associated with the second terminal, the status published by the second terminal, and the identifier of the second terminal that are extracted by the terminal status subscription apparatus from the first status change notification message; and sending a second status change notification message to the first terminal, the second status change notification message comprising the identifier of the to-be-subscribed-to user, the identifier of the second terminal, and the status published by the second terminal.

14. The first presence server according to claim 13, wherein the first subscription message further comprises a destination address, and the destination address of the first subscription message is an identifier of any terminal among the terminals.

* * * * *

UNITED STATES PATENT AND TRADEMARK OFFICE
CERTIFICATE OF CORRECTION

PATENT NO. : 10,038,664 B2
APPLICATION NO. : 15/056416
DATED : July 31, 2018
INVENTOR(S) : Shuo Wang et al.

Page 1 of 1

It is certified that error appears in the above-identified patent and that said Letters Patent is hereby corrected as shown below:

On the Title Page

Item (72), Line 2: "Hanzhou" should be "Hangzhou"

Item (30), Line 1: "201310382363" should be "201310382363.1"

In the Claims

Column 20 / Line 6: delete "wherein"

Signed and Sealed this
Twenty-fifth Day of September, 2018

Andrei Iancu
*Director of the United States Patent and Trademark Office*